June 24, 1952 — T. B. HULSAPLE — 2,601,437
EDGE FINDING INDICATOR
Filed Jan. 13, 1950

INVENTOR.
THEODORE B. HULSAPLE
BY
McMorrow, Berman & Davidson
ATTORNEYS

Patented June 24, 1952

2,601,437

UNITED STATES PATENT OFFICE 2,601,437

EDGE FINDING INDICATOR

Theodore B. Hulsaple, Poughkeepsie, N. Y.

Application January 13, 1950, Serial No. 138,431

2 Claims. (Cl. 33—172)

This invention relates to gauge devices, and more particularly to a gauge device for accurately locating the edge of a work piece with respect to the spindle of a machine tool.

A main object of the invention is to provide a novel and improved edge locating device for accurately setting the edge of a work piece with respect to the spindle of a machine tool, said device being very simple in construction, being easy to use, and providing an accurate indication of the location of the edge of the work piece with respect to the machine tool spindle.

A further object of the invention is to provide an improved gauge device for accurately locating the edge of a work piece with respect to a machine tool spindle, said device involving only a few parts, being rugged in construction, and providing a means of greatly improving the accuracy of drilling, boring and similar operations on a work piece.

Further objects and advantages of the invention will become apparent from the following description and claims, and from the accompanying drawings, wherein:

Figure 1:
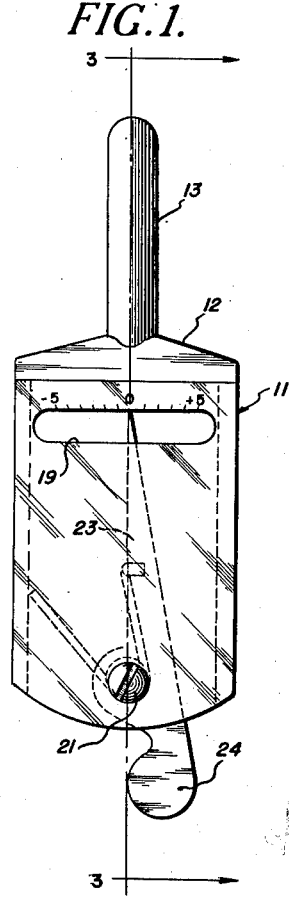
Figure 1 is a front elevational view of an improved edge locating gauge device constructed in accordance with the present invention.

Referring to the drawings, the gauge device is generally designated at 11 and comprises a main body 12 which is formed at its top end with an axial stem or shaft 13 adapted to be received in the chuck of a drill press or other machine tool. The body 12 is of substantial width and is formed with a channel-shaped recess 14 having the longitudinal side walls 15, 15. Designated at 16 is a rear cover plate which is secured to the side walls 15, 15, as by rivets 17. There is thus defined an internal cavity which is open at its bottom end and whose top wall comprises the transverse portion 18 of the main body 12. The rear wall of the channeled portion of the main body 12 is formed with a horizontal slot 19 and the cover plate 16 is likewise formed with a horizontal slot 20 which is aligned with the slot 19.

Extending through the lower portion of the cover plate 16 and threaded into the lower portion of the rear wall of the body 12 is a bolt 21 which is located in the longitudinal center plane of the body 12 in alignment with the stem 13.

Figure 2:
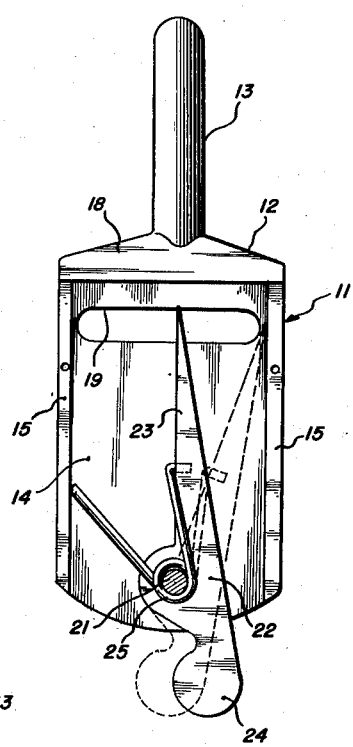
Figure 2 is a rear elevational view of the gauge device of Figure 1, with the rear cover plate removed.
Figure 3:
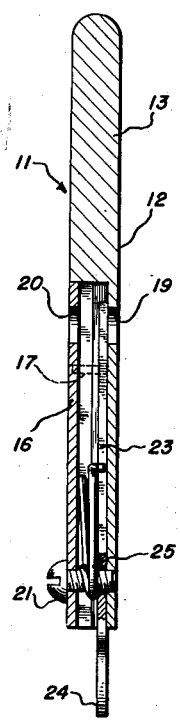
Figure 3 is a vertical transverse cross-sectional view taken on line 3—3 of Figure 1.

Rotatably mounted on the bolt 21 is a pointer lever 22 which has a tapered top pointer element 23 and a depending rounded feeler element 24 which is located in a plane parallel to the plane of the body 12. Designated at 25 is a coil spring which encircles the bolt 21 within the cavity 14 and has one end thereof bearing against one side wall 15 and the other end thereof hooked around the left edge of the pointer element 23, as viewed in Figure 2, whereby the pointer lever 22 is biased clockwise, as viewed in Figure 2. The margins of the slots 19 and 20 are marked with a suitable scale having a zero point preferably located at the mid-point of the slot margin, as shown in Figure 1, the left edge of the pointer element 23 being preferably tangent to the left peripheral edge portion of the feeler element 24, whereby the pointer element 23 will provide a zero indication when the left peripheral edge portion of the feeler element 24 engages the edge of a work piece in exact alignment with the left edge of the pointer element. Normally, the spring 25 biases the pointer element 23 to the dotted line position shown in Figure 2. When it is desired to align the edge of a work piece with the spindle of a machine tool, the stem 13 is inserted in the chuck of the machine tool and the edge of the work piece is moved against the feeler element 24 until the pointer 23 provides a zero indication with respect to the graduated scale, the position of the pointer element being viewed through the slot 19 or the slot 20.

It will be apparent from the above description that if it is desired to perform a drilling or similar machine operation on a work piece at a specified distance from the edge thereof, it is merely necessary to align the edge of the work piece with the spindle axis by employing the device of the present invention in the manner above described, and then to merely move the work piece transversely to a distance equal to the specified distance at which the tool operation is to be formed with respect to the edge of the work piece. The pointer element 23 is preferably much greater in length than the radius from the bolt 21 to the feeler element 24, whereby deviations from centered position of the stem of the device 13 with respect to the edge of the work piece are greatly multiplied.

While a specific embodiment of an improved edge locating gauge device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An edge locating device comprising a housing having opposing side and end walls, an open bottom wall and closed top wall, supporting means for the housing formed on the top wall, a pivot member transversely mounted between the side walls, a lever pivoted on said member and having an upper pointer terminal swingable between the side walls and positionable at various points relative to the end walls, said side walls having transversely aligned slots horizontally formed therein and exposing the pointer terminal of the lever, a lower feeler terminal formed on the lever and disposed below the walls of the housing and spring means carried by said pivot member for normally urging said pointer terminal into contact with one of the end walls, the pointer terminal being positioned at one end of the slots and being movable relative to the other end in an exposed manner by the feeler terminal in pressure contact with the edge of an object.

2. An edge locating device comprising a housing having opposing side and end walls, an open bottom wall and closed top wall, supporting means for the housing formed on the top wall, a pivot member transversely mounted between the side walls, a lever pivoted on said member and having an upper pointer terminal swingable between the side walls and positionable at various points relative to the end walls, said side walls having transversely aligned slots horizontally formed therein and exposing the pointer terminal of the lever, a lower feeler terminal formed on the lever and disposed below the walls of the housing and spring means carried by said pivot member and bearing against one of the end walls and the lever for urging the lever into contact with one of the end walls and for retaining it in adjacency to one of the side walls during its swinging movement about the pivot, said pointer terminal being movable from the said contacted end wall by the feeler terminal in pressure contact with the edge of an object.

THEODORE B. HULSAPLE.

REFERENCES CITED

The following references are of record in the file of this patent:

UNITED STATES PATENTS

| Number | Name | Date |
|--------|------|------|
| 579,573 | Goff | Mar. 30, 1897 |
| 693,744 | Sears | Feb. 18, 1902 |
| 910,706 | Montan | Jan. 26, 1909 |
| 913,331 | Waldrip et al. | Feb. 23, 1909 |
| 1,399,314 | Nicholson | Dec. 6, 1921 |
| 1,994,497 | Winters | Mar. 19, 1935 |